United States Patent
Kim (10) Patent No.: US 8,922,649 B2
(45) Date of Patent: Dec. 30, 2014

(54) METHOD AND APPARATUS FOR PROCESSING VIDEO FRAME

(75) Inventor: Kwang Baek Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 1516 days.

(21) Appl. No.: 12/122,862

(22) Filed: May 19, 2008

(65) Prior Publication Data
US 2009/0059002 A1 Mar. 5, 2009

(30) Foreign Application Priority Data
Aug. 29, 2007 (KR) .................. 10-2007-0086895

(51) Int. Cl.
H04N 7/18 (2006.01)
H04N 5/225 (2006.01)
G06K 9/00 (2006.01)
G08B 13/196 (2006.01)

(52) U.S. Cl.
CPC .......... *H04N 7/188* (2013.01); *G08B 13/19645* (2013.01); *G08B 13/19652* (2013.01); *G08B 13/19671* (2013.01)
USPC ........... 348/143; 348/144; 348/149; 348/152; 348/154; 348/169; 382/181

(58) Field of Classification Search
USPC ....................................... 348/143
See application file for complete search history.

(56) References Cited

U.S. PATENT DOCUMENTS

| 6,816,184 | B1* | 11/2004 | Brill et al. ............... | 348/143 |
| 6,985,172 | B1* | 1/2006 | Rigney et al. ............. | 348/149 |
| 7,035,434 | B2* | 4/2006 | Estevez ..................... | 382/107 |
| 7,444,287 | B2* | 10/2008 | Claudatos et al. ........ | 704/270 |
| 2005/0007454 | A1* | 1/2005 | Needham ................. | 348/143 |
| 2007/0058836 | A1* | 3/2007 | Boregowda et al. ..... | 382/103 |
| 2008/0007620 | A1* | 1/2008 | Wang et al. ............. | 348/154 |
| 2009/0015671 | A1* | 1/2009 | Addy ....................... | 348/143 |

FOREIGN PATENT DOCUMENTS

| KP | 10-2004-0018586 A | 3/2004 |
| KR | 10-2006-0086506 A | 8/2006 |

OTHER PUBLICATIONS

Renjie Li; Songyu Yu; Xiaokang Yang, "Efficient Spatio-temporal Segmentation for Extracting Moving Objects in Video Sequences," Consumer Electronics, IEEE Transactions on , vol. 53, No. 3, pp. 1161,1167, Aug. 2007.*

Jiang Dan; Yu Yuan, "A Multi-object Motion-tracking Method for Video Surveillance," Software Engineering, Artificial Intelligence, Networking, and Parallel/Distributed Computing, 2007. SNPD 2007. Eighth ACIS International Conference on , vol. 1, No., pp. 402,405, Jul. 30, 2007-Aug. 1, 2007.*

(Continued)

*Primary Examiner* — Taylor Elfervig (74) *Attorney, Agent, or Firm* — Birch, Stewart, Kolasch & Birch, LLP (57) ABSTRACT

A surveillance video processing method including selecting at least one target object from a surveillance area, capturing image information of the surveillance area, detecting motion has occurred in the surveillance area using the captured image information, extracting feature data of an object causing the detected motion, comparing the extracted feature data of the object causing the detected motion and feature data of the at least one target object, and determining whether or not to perform a recording operation for recording the captured image information based on a result of the comparing step.

24 Claims, 9 Drawing Sheets

(56) References Cited

OTHER PUBLICATIONS

Meyer, M.; Hotter, M.; Ohmacht, T., "A new system for video-based detection of moving objects and its integration into digital networks," Security Technology, 1996. 30th Annual 1996 International Carnahan Conference , vol., No., pp. 105,110, Oct. 2-4, 1996.*

Zhengping Wu; Jiajun Bu; Chun Chen, "Detection and location of people in video streams by fusion of color, edge and motion information," Image Processing. 2002. Proceedings. 2002 International Conference on , vol. 3, No., pp. III-449,III-452 vol. 3, 2002.*

* cited by examiner

FIG. 7 object selection block feature extaction

Feature information
- Object ID
- Shape
- Texture
- Color
  ⋮
- Valid CH #(Ex : CH1, CH5)
  ⋮

FIG. 8

Feature information
- Object ID_1
- Shape
- Texture
- Color
- Level_4(Ex : Valid Channel 1, 2, 3, 4)
⋮
- Object ID_2
- Shape
- Texture
- Color
- Level_2(Ex : Valid Channel 2, 3, 4)
⋮

FIG. 9

METHOD AND APPARATUS FOR PROCESSING VIDEO FRAME

This non-provisional application claims priority under 35 U.S.C. §119(a) to Korean Patent Application No. 10-2007-86895 filed in Republic of Korea on Aug. 29, 2007, the entire contents of which is hereby incorporated by reference.

BACKGROUND OF THE INVENTION

1. Field of the Invention

The present invention relates to a video processing method and apparatus that selectively records moving objects that need to be recorded and that does not record moving objects that don't need to be recorded.

2. Description of the Related Art

Figure 1:
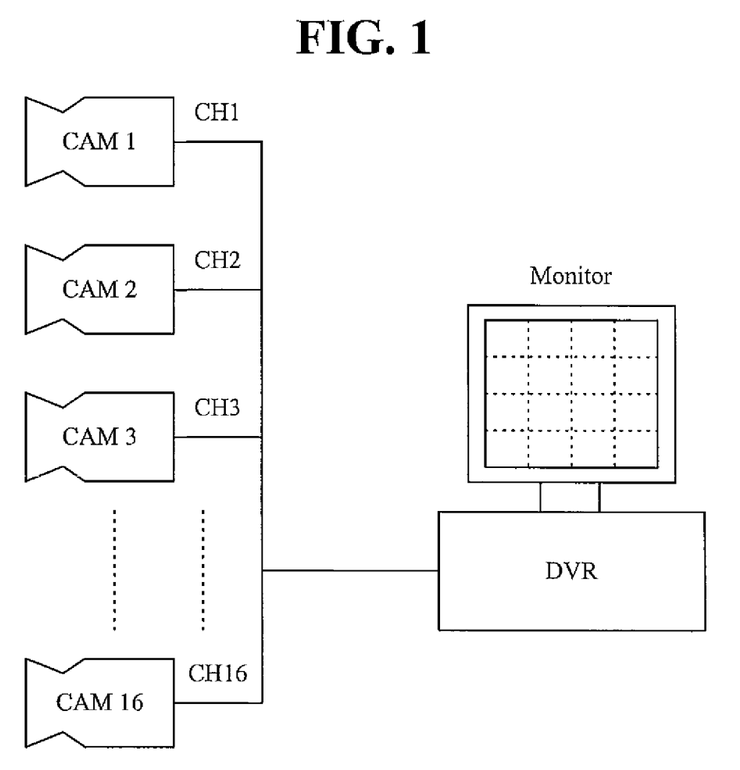
FIG. 1 is an overview illustrating a surveillance system including a plurality of cameras connected to a DVR.

Many business and homes now use surveillance cameras to monitor and capture images occurring in particular locations that the user wants to protect or secure. For example, FIG. 1 illustrates a surveillance system including sixteen surveillance cameras CAM 1 to CAM 16 that capture images of subjects at corresponding areas, and transmit the captured images to a DVR at a remote place.

The DVR then displays the images captured by the surveillance cameras on a monitor, and also records the captured images in a storage medium therein, such as a hard disk or an optical disk. Further, unique channel numbers CH 1 to CH 16 are allocated to the sixteen cameras of FIG. 1, respectively, and managed. The DVR then displays each channel on a different portion of a display so the user can monitor the different locations.

However, because the DVR has a limited memory capacity, images that have been previously recorded are sometimes replaced with new captured images. For example, the DVR generally reuses a tape every 24 hours. The related art DVR also does not selectively record images, but is a passive device that records all captured images.

SUMMARY OF THE INVENTION

Accordingly, one object of the present invention is to address the above-noted and other problems.

Another object of the present invention is to provide a method and apparatus that selectively does not record objects that need not be recorded.

To achieve these and other advantages and in accordance with the purpose of the present invention, as embodied and broadly described herein, the present invention provides in one aspect a surveillance video processing method, which includes selecting at least one target object from a surveillance area, capturing image information of the surveillance area, detecting motion has occurred in the surveillance area using the captured image information, extracting feature data of an object causing the detected motion, comparing the extracted feature data of the object causing the detected motion and feature data of the at least one target object, and determining whether or not to perform a recording operation for recording the captured image information based on a result of the comparing step.

In another aspect, the present invention provides a surveillance video processing apparatus, which includes an input unit configured to select at least one target object from a surveillance area, a camera unit configured to capture image information of the surveillance area, a motion detector configured to detect motion has occurred in the surveillance area using the captured image information, a feature extractor configured to extract feature data of an object causing the detected motion, and a control unit configured to compare the extracted feature data of the object causing the detected motion and feature data of the at least one target object, and to determine whether or not to perform a recording operation for recording the captured image information based on a result of the comparison.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

One option of performing a surveillance operation is to set a DVR motion recording mode or function in which a captured image is not recorded (or recorded at a minimum frame rate) when there is no change of a subject within the captured image. Further, the DVR compares neighboring frames within a frame sequence of monitored images received from surveillance camera to determine any motion of a subject within the monitored images.

The DVR can then detect motion vectors for the subject having motion (information including the direction and extent of the motion of the subject in a neighboring frame and a current frame) through an inter-frame prediction method used in video compression. When the detected motion vector exceeds a specific reference value (that is, the motion of the subject is significant), the DVR records a frame sequence of the monitored images received from a corresponding point of time. Otherwise, the DVR does not record the captured or monitored images. Thus, the amount of memory used in reduced.

Another option is to selectively record images in which selected target objects are disregarded. For example, images captured by a camera viewing an entrance area can be processed such that employees or persons that are allowed access to the entrance area can be designated as target objects. Then, the images corresponding to the target objects are not recorded. However, when an individual enters the entrance area that is not authorized to access the entrance area, the images corresponding to this individual are recorded.

Similarly, images corresponding to the motion of the ocean can not be recorded as the motion of the ocean is designated as a target object, but images corresponding to a ship moving on the ocean are recorded and stored. That is, a user can selectively designate particular target objects in a surveillance area that are not to be recorded.

Figure 2A:
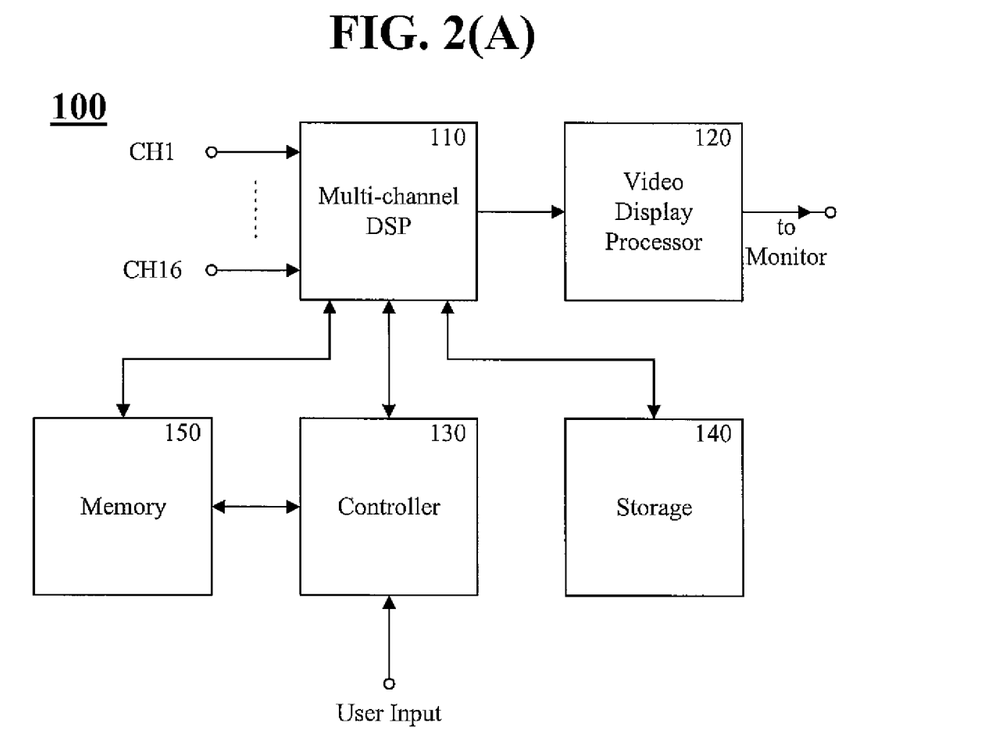
FIG. 2(A) is block diagram of a DVR according to an embodiment of the present invention.

Further, the present invention may be applied to various types of digital devices for capturing images and recording captured images such as a DVR. For example, FIG. 2(A) is a block diagram of a DVR 100 including a multi-channel digital signal processor 110 (DSP), a video display processor 120, a controller 130, a storage unit 140 and memory 150.

Figure 2B:
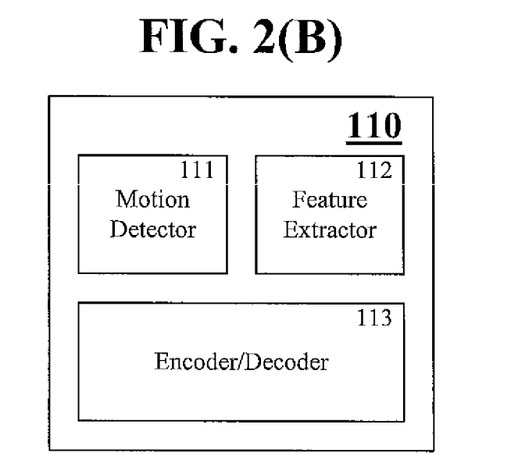
FIG. 2(B) is block diagram of a Digital Signal Processor shown in FIG. 2(A) according to an embodiment of the present invention.

FIG. 2(B) is a block diagram of the DSP 110. As shown in FIG. 2(B), the DSP 100 includes a motion detector 111, a feature extractor 112 and an encoder/decoder 113. The motion detector 111, the feature extractor 112, and the encoder/decoder 113 may be implemented via a software algorithms or a combination of software and hardware. Further, the functions of the DSP 110 and the controller 130 may be implemented as one function.

In addition, the DSP 110 receives camera video signals from, for example, first to sixteenth channels CH1 to CH16, and processes the signals as digital video data. The DSP 110 then outputs the video data to the video display processor 120, and the video display processor 120 displays video data of channels, which are selected by an operator, on monitor screens according to a selected display mode, for example, one channel display mode or 4 channel display mode.

Further, the DSP 110 compresses the video data according to a specific format such as the MPEG format through the encoder/decoder 113, and records the compressed video data in the storage unit 140 on a per channel basis. The storage unit 140 can be a hard disk, optical disk, etc.

In addition, the controller 130 controls the DSP 110 to read and restore data that has been recorded in the storage unit 140 according to a user's request, etc. and controls the video display processor 120 to display the video on the monitor screens. When the motion-recording mode has been set, the DSP 110 determines whether motion has occurred in monitored images of each channel received from a plurality of surveillance cameras through the motion detector 111.

If motion has been detected, the DSP 110 encodes the monitored images of a corresponding channel through the encoder/decoder 113, and records encoded images in the storage unit 140. Also, if a "selective motion recording mode" is selected by a user, the controller 130 controls the DSP 110 to allow a user to set an area selection block of a desired shape such as a square or circle, and a desired size at a desired location within a monitoring image screen through an input device such as a mouse. That is, the user can select a target object that will not be recorded although motion occurs within monitored images or a target area encompassing objects that are difficult to specify (for example, the ocean having waves) within the monitored images.

Figure 3:
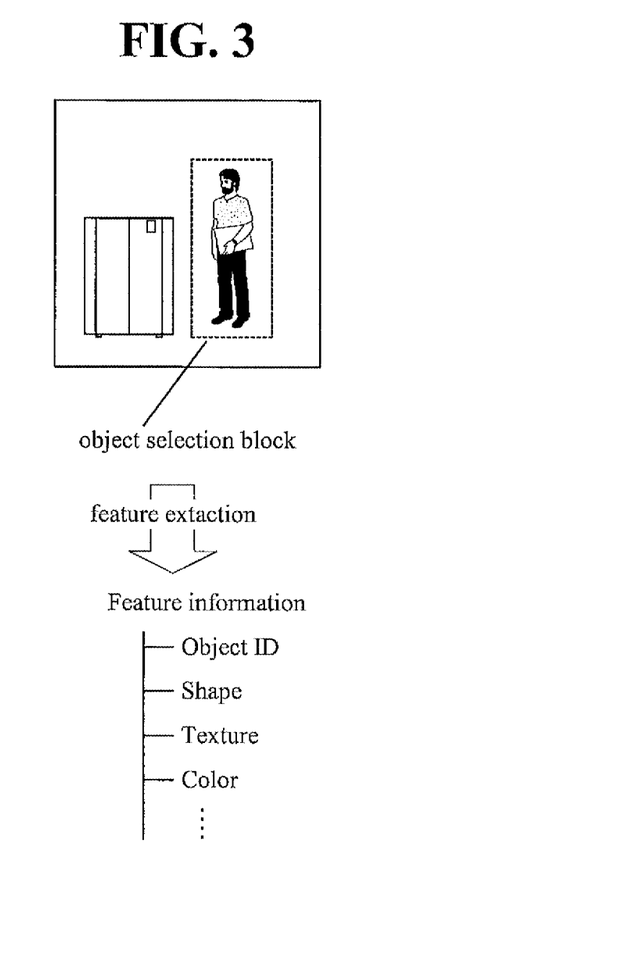
FIG. 3 is an overview illustrating, selecting a target object and extracting feature information from the selected target object according to an embodiment of the present invention.

Further, if a target object or a target area is selected by a user, the controller 130 extracts features of the selected object or area (for example, a shape, a size, texture, color, edge motion and so on) through the feature extractor 112 of the DSP 110, and stores the extracted features in the memory 150. Also, an object ID for identifying the target object is also recorded in the memory 150 in association with the feature data. FIG. 3 is an overview illustrating extracted feature data for a target object.

Thereafter, if motion is detected within the monitored images through the motion detector 111 in the selective motion-recording mode, the feature extractor 112 extracts features of the object, which are associated with the detected motion. The controller 130 then compares the extracted features of the object with features of a target object stored in the memory 150 to determine whether the monitored images having the motion will be recorded.

In other words, if it is determined that the object having the motion is the target object, the controller 130 disregards the motion and does not record a corresponding monitored image. That is, the controller 130 controls the encoder/decoder 113 of the DSP 110 to encode the monitored image of a channel in which the motion has been detected and records the encoded image in the storage unit 140 only if it is determined that the object having the motion is not the target object.

In addition, instead of selecting a target object or a target area as described above, the DSP 110 can also sense a subject having motion within a monitored image through the motion detector 111 and the feature extractor 112 for a predetermined time, extract features from a corresponding subject, and generate feature data of the subject having motion as text data of a XML form. In this state, if a user selects a target object from a subject list included in a text displayed or printed on the screen, the controller 130 stores the feature data of the selected target object in the memory 150.

Figure 4:
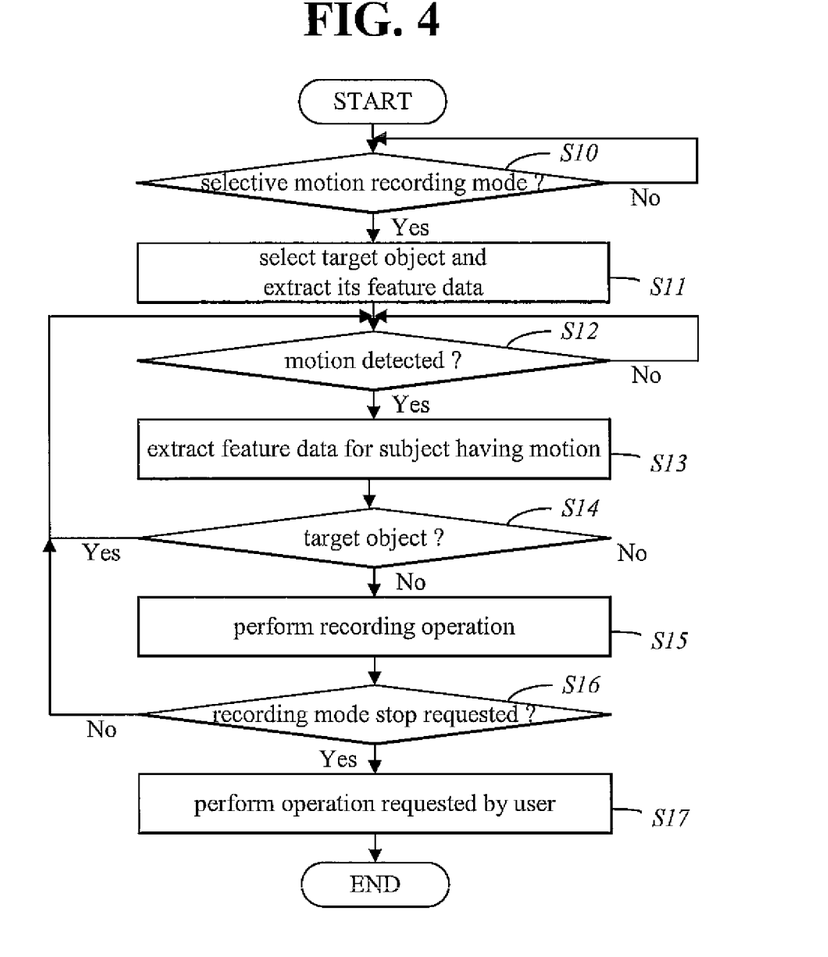
FIG. 4 is a flowchart illustrating a video processing method according to an embodiment of the present invention.

Next, FIG. 4 is a flowchart illustrating a video processing method according to an embodiment of the present invention. As shown, the method first determines if the user has selected the selective motion recording mode (S10). If the selective motion recording mode has been selected (Yes in S10), the controller 130 controls the DSP 110 to display an area selection block on a monitoring image screen so that a target area encompassing target objects that will not be recorded or objects that are difficult to specify can be selected. The controller 130 also allows a user to set the selection area of a desired size at a desired location within the monitoring image screen through an input device such as a mouse.

If the user sets the selection area and selects a specific subject within the monitored image as a target object, the controller 130 controls the feature extractor 112 to extract feature information about the target object within the selection area such as a shape, size, texture, color, edge, and motion, and stores the extracted feature information in the memory 150 in association with an object ID (S11).

The motion detector 111 then determines whether motion having a certain value or more occurs by performing a motion detection operation of detecting subject motion components through comparison of a video frame of a monitored image currently being captured and a video frame that was previously captured. If it is determined that motion having a certain value or more occurs (Yes in S12), the feature extractor 112 extracts feature data of the subject causing the motion, and transmits the extracted feature data to the controller 130 (S13). The controller 130 then compares the extracted feature data with the target object feature information stored in the memory 150 to determine if the target object is within the captured images (S14).

In addition, the controller 130 can determine if there are many feature factors identical or similar to each other among a plurality of feature factors such as a shape, a size, texture, color, edge, and motion, or a degree in which some feature factors are identical to each other is high, etc. to determine an object causing the motion is the target object.

Figure 5:
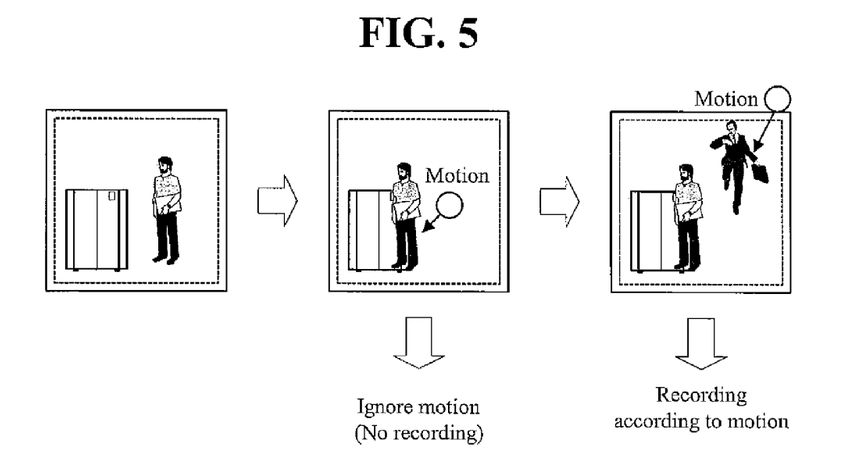
FIG. 5 is an overview illustrating selectively disregarding motion detected with respect to a target object according to an embodiment of the present invention.

If, as a result of the comparison, it is determined that the subject causing the motion is identical to the target object (Yes in S14), the controller 130 disregards the detection of the motion of the target object, for example as shown in FIG. 5, so that a recording operation is not performed. However, if it is determined that the subject having the motion is not identical to the target object, the controller 130 controls the encoder/decoder 113 of the DSP 110 so that a recording operation according to such motion detection is performed (S15). For example, as shown in FIG. 5, if motion is detected by other subjects except for a target object, the controller 130 controls the encoder/decoder 113 of the DSP 110 so that a recording operation is performed. In addition, if the user requests the motion detection operation to stop (Yes in S16), the controller 130 performs the operation requested by the user (S17).

As described above, by disregarding motion of a target object selected by a user, unnecessary recording operations owing to motion of authorized persons (target objects) can be prevented from being performed.

Further, when a plurality of target objects that can move freely are set, the controller 130 and the DSP 110 extract feature information about the plurality of target objects, store the features in the memory 150 in association with respective object IDs, and compare feature data extracted from subjects causing motion in the selective motion-recording mode with the feature data of the respective target objects. Accordingly, motion by the plurality of target objects can be disregarded, and unnecessary recording operations can be prevented from being performed.

Figure 6:
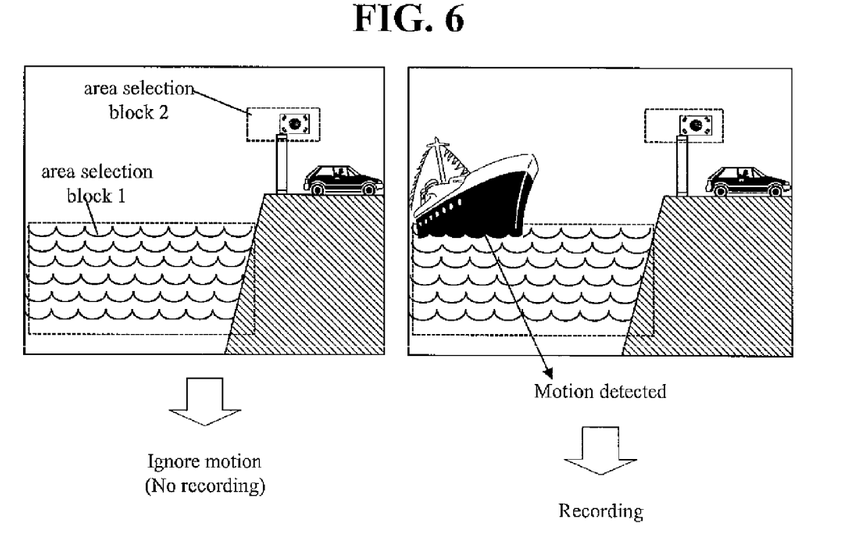
FIG. 6 is an overview illustrating selectively disregarding motion detected in target areas according to another embodiment of the present invention.

In addition, when a subject that has continuous motion and is difficult to specify such as the sea, a river and a lake having waves, or a flag that is tied to a fixed place and flutters in a wind are included in a monitoring image, for example, as shown in FIG. 6, the DSP 110 and the controller 130 allow a user to select an area occupied by the subject that is difficult to specify through an area selection block. The DSP 110 and the controller 130 also detect feature data of the selected area, store the detected feature data in the memory 150 in association with information (for example, coordinates and size data) indicating the selected area (an area in which it is expected that motion may happen in the subject that is difficult to specify), and disregard motion having feature data being identical to the feature data stored in association with a corresponding area having similar features among pieces of motion detected in the selected area. Accordingly, a recording operation by a subject that has meaninglessly repeated motion can be prevented from being performed.

Figure 7:
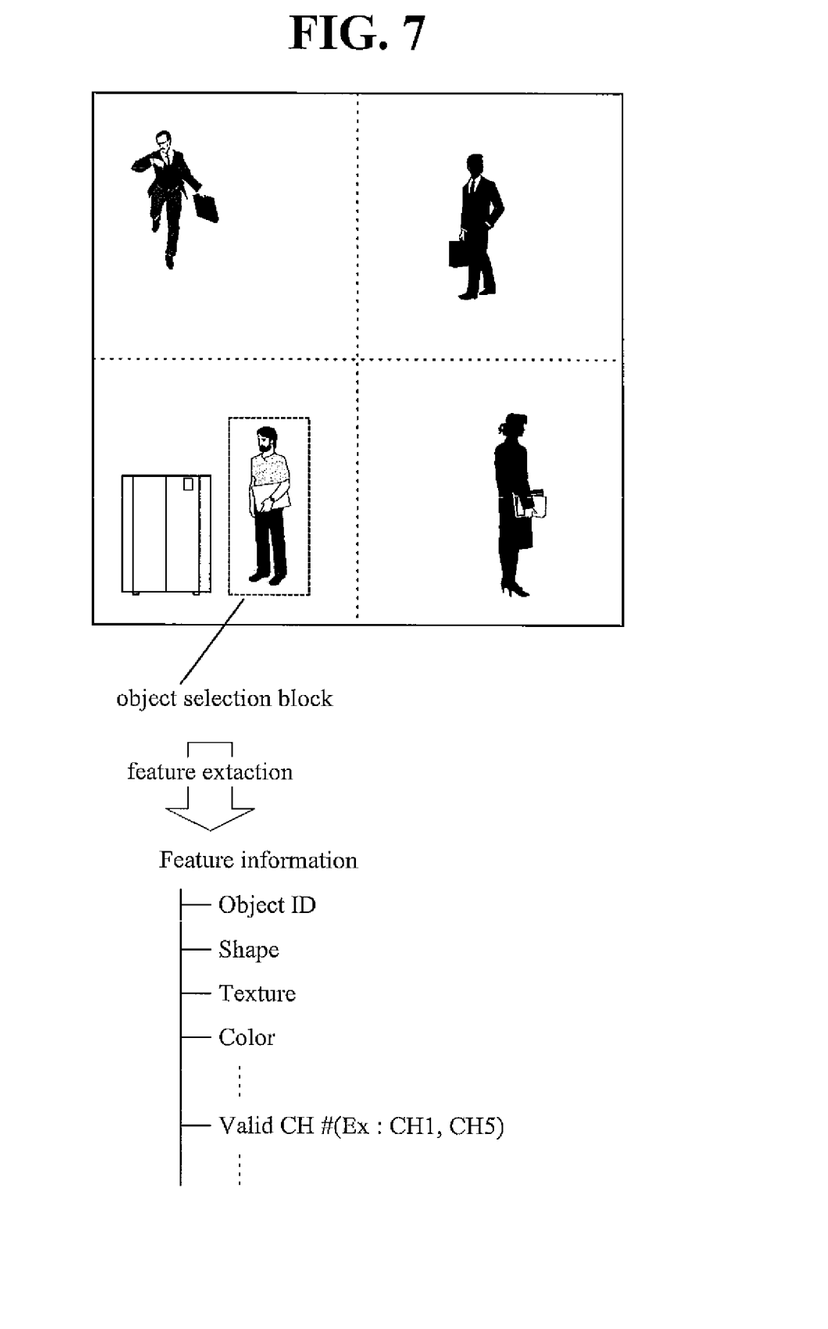
FIG. 7 is an overview illustrating selectively storing valid channel information in association with feature information of a target object according to an embodiment of the present invention.

Next, FIG. 7 is an overview illustrating valid channel information being stored in association with feature information of a target object according to an embodiment of the present invention. In more detail, when a user selects a target object within a divided image corresponding to a specific channel through an area selection block when monitored images of several channels are divided and displayed on one screen, the controller 130 automatically generates a unique object ID for identifying the target object when storing feature information of the selected target object, and stores the feature information in association with the object ID, or stores the feature information in association with an object ID specified by a user.

Further, the controller 130 stores the feature information in association with valid channel information (Valid CH #) to disregard motion that is generated by the target object. For example, if a user specifies the channel 1 (CH1) and the channel 5 (CH5) as valid channel information, the controller 130 disregards motion generated by the target object in a first camera image and a fifth camera image corresponding to the channel 1 and the channel 5, respectively, so that the target object can freely move in a photographed place of the first camera and a photographed place of the fifth camera.

Figure 8:
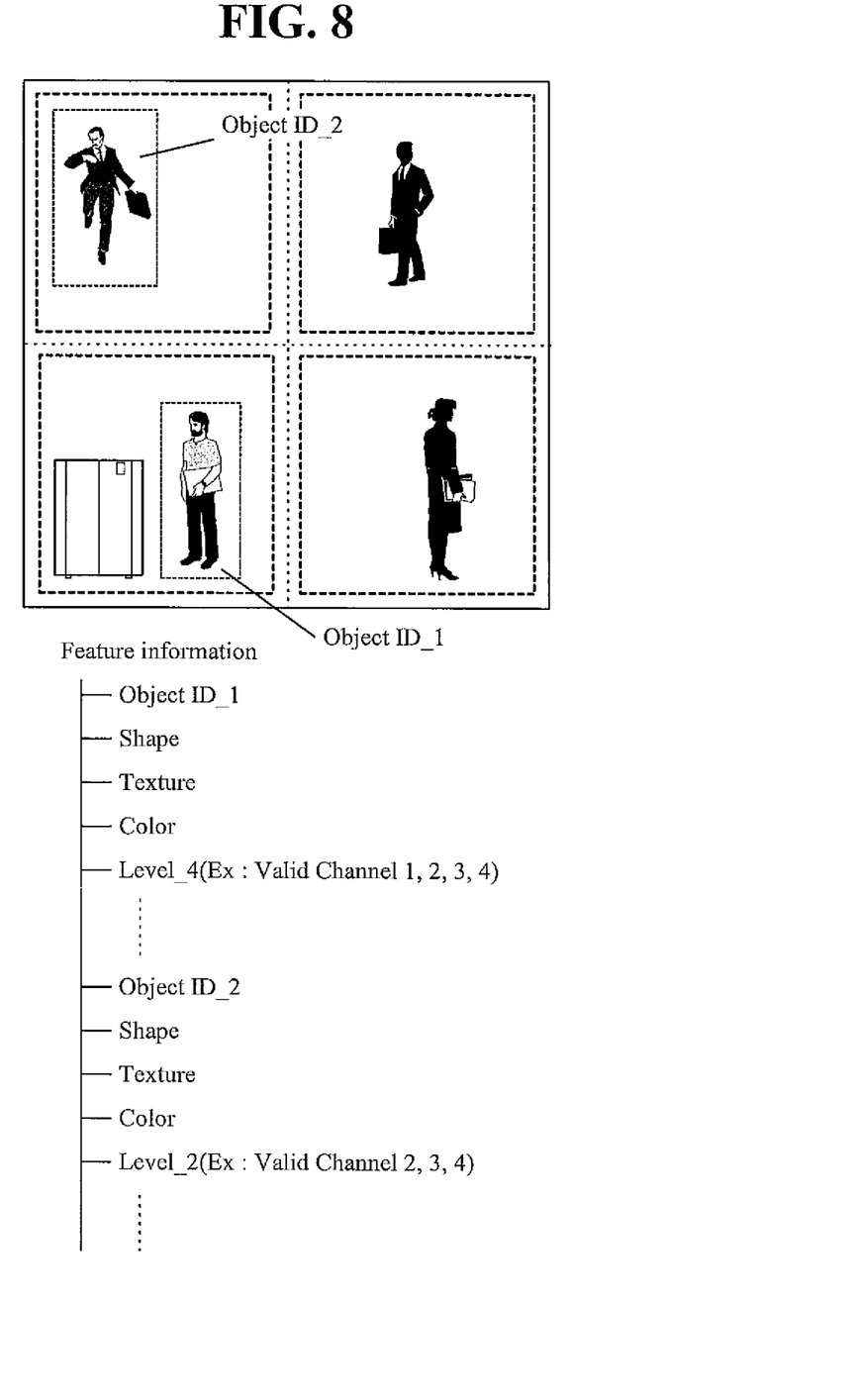
FIG. 8 is an overview illustrating selectively storing valid channel level information in association with feature information of a target object according to an embodiment of the present invention.

Next, FIG. 8 is an overview illustrating valid channel level information being stored in association with feature information of a target object according to an embodiment of the present invention. In more detail, a level indicating a security priority is allocated to each channel, and a level is set to each target object. Thus, although motion is detected in a corresponding target object, it is possible to decide which channel will be disregarded.

For example, if a user selects a first target object and a second target object and then sets a valid channel level of a level 4 to the first target object and a valid channel level of a level 3 to the second target object, the controller 130 stores information of the first target object Object ID_1 in association with the level 4 Level_4 and information of the second target object Object ID_2 in association with the level 3 Level_3, as shown in FIG. 8.

Further, if motion of the first target object is detected in monitored images of, for example, the first to fourth channels CH 1, 2, 3, and 4, the controller 130 disregards the motion so that the first target object can freely move between camera photographed places corresponding to the first to fourth channels.

On the other hand, if motion of the second target object is detected in monitored images of, for example, the second to fourth channels CH 2, 3, and 4, the controller 130 disregards the motion so that the second target object can freely move between camera photographed places corresponding to the second to fourth channels, except the place corresponding to the first channel. Accordingly, the user can set several places where a plurality of target objects can move freely.

Figure 9:
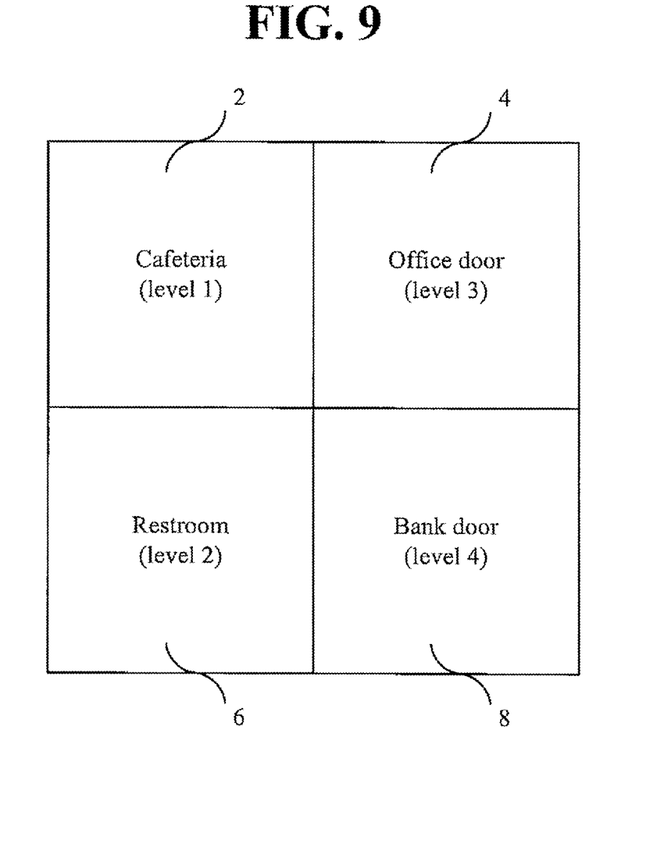
FIG. 9 is an overview illustrating selectively assigning priority levels to target objects and target areas according to an embodiment of the present invention.
Figure 10:
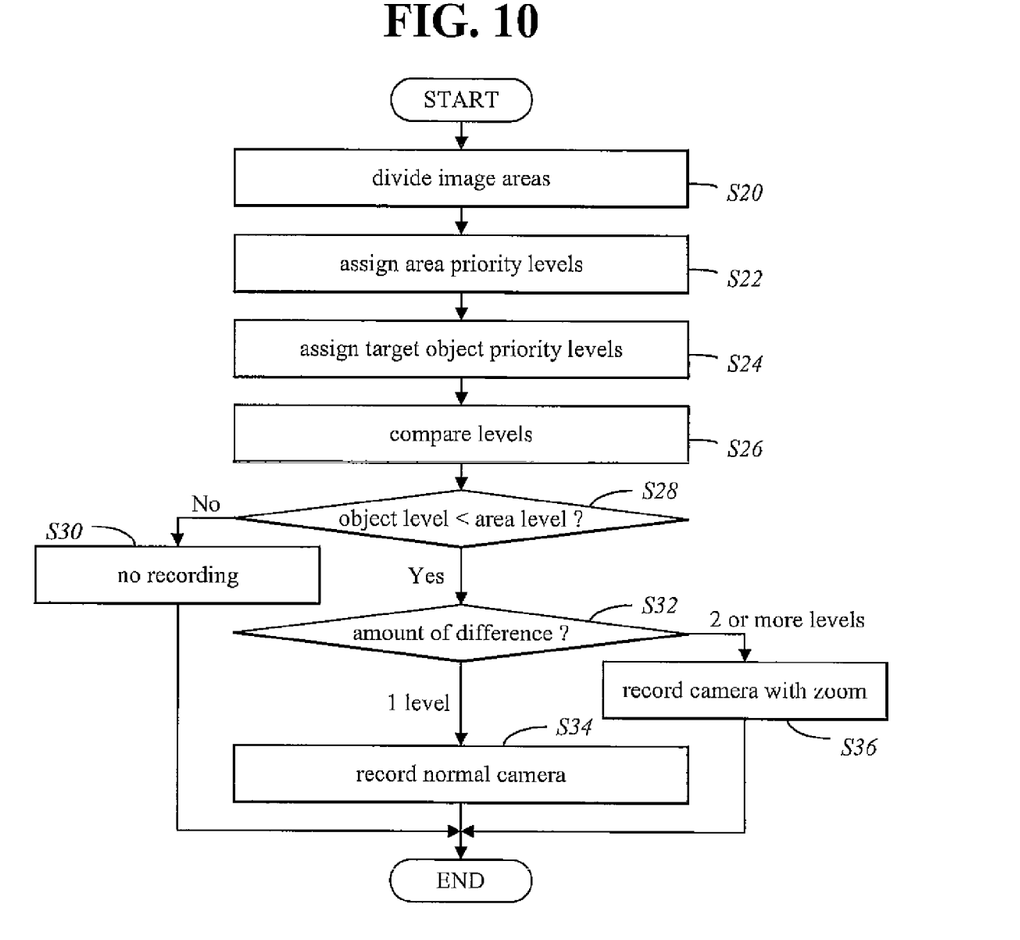
FIG. 10 is a flowchart illustrating a method of selectively recording data based on assigned priority levels according to an embodiment of the present invention.

Next, FIGS. 9 and 10 illustrate another embodiment of the present invention. That is, FIG. 9 is an overview illustrating selectively assigning priority levels to target objects and target areas, and FIG. 10 is a flowchart illustrating a method of selectively recording data based on assigned priority levels according to an embodiment of the present invention.

As shown in FIG. 10, a user can first set priority levels for different areas that are monitored by a camera surveillance system. The below description assumes a single camera is used to capture the areas noted in FIG. 9, but a plurality of cameras may also be used.

As shown in FIG. 9, the user has designated the cafeteria area 2 as a level 1 priority, the office door area 4 as a level 3 priority, the restroom area 6 as a level 2 priority, and the bank door area 8 as a level 4 priority. In this example, a higher priority level is deemed to be a more secure area, thus requiring closer surveillance. The user is also able to freely set the desired priority levels using an appropriate input unit provided with the surveillance system. The user may also freely set the different areas within a monitored region.

In addition, as described above in the other embodiments, the user can set or designate a particular target object or objects that are to be disregarded so as to reduce the amount of information recorded. In this embodiment, the user can also designate priority levels for the different target objects. Thus, the user can designate a priority level to a bank employee that is selected as a target object that matches or is above the priority level assigned to the bank door area 4.

For example, the user can designate the bank employee a priority level of 5 such that the bank employee is not recorded, because the bank employee has a higher priority than the bank door area 4. However, if a target object had an assigned priority level that was less than the bank door priority level, the DVR records the captured images related to this target object. It is also possible to determine how much the priority level of the target object differs from the priority level of the target area, and perform different camera functions based on the difference (e.g., use zooming features when the priority levels differ by two or more).

These features are illustrated in more detail in the flowchart of FIG. 10. As shown in FIG. 10, the user is first given the opportunity to divide image areas and assign priority levels to the image areas and target objects (S20, S22 and S24, respectively). For example, the user can be highlight or mark a monitoring screen using a mouse to designate particular areas in the monitored image such as the cafeteria area 2, the office door area 4, etc. in FIG. 9.

The user can also designate particular target objects such as employees by using previously capture images of the target objects, and selectively designating priority levels to the target objects. The digital signal processor 110 can the compare the target objects with objects appearing in the monitored image to determine if the person in the monitored image is the same as the target object. As discussed above, the user can also designate different priority levels to the target objects.

Then, as shown in FIG. 10, the method compares the priority levels of the target objects with the priority levels of the target areas (S26). The method then determines if the priority level of the target object is less than the priority level of the target area (S28). If the priority level of the target object is higher than the priority level of the target area (No in S28), the DVR does not record the images corresponding to the target object, because the target object has been designated as having access to the target area. That is, the target object has a priority level that is higher than the priority level of the target area.

If the target object is less than the priority level of the target area (Yes in S28), the method compares by how much the priority levels differ from one another (S32). If the priority levels differ by one level, the method records the captured images using a normal or regular camera function. For example, if the target object had a priority level of 3 and was in the bank door area, which has a priority level of 4, the method would record these captured images using the normal or regular camera function.

Alternatively, if the priority levels of the target object and target area differ by two or more levels, then the method instructs the camera to perform a zooming feature to zoom in on the target object and records the captured images. For example, if an employee from the cafeteria was assigned a priority level of 2 that matches the priority level of the cafeteria (meaning the person has free access to the cafeteria), and entered the bank door area 8, the method would zoom in on this person and record the captured images, because the person's priority level is 2 levels different from the priority level of the bank door area 8.

In addition, it is also possible for the user to set stationary objects as target objects that are to be disregarded when the recording operation is being performed. For example, in a convenience store, there is generally a long counter at which customers check out and pay for items. Many times, the counter blocks the view of the customer's legs and waist. Therefore, there is less need to capture images appearing behind the counter, because only the counter appears in the captured images and blocks things behind the counter.

Therefore, the user can designate the counter area as being a target area that is not to be recorded. Thus, even though the image information corresponding to the counter is initially captured, this information may be extracted and disregarded when the recording operation is performed. Thus, the user is given great flexibility is setting up their particular surveillance system according to their personal security issues.

Therefore, using the recording control apparatus and method employing motion detection according to embodiments of the present invention motion by authorized persons entering specific places or motion by waves of the sea is selectively disregarded. Therefore, it is possible to reduce the amount of information recorded.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A surveillance video processing method, comprising:
selecting at least one target object from a surveillance area;
capturing images of the surveillance area;
detecting whether motion has occurred in the surveillance area by calculating a motion component between a current frame and a neighboring frame of the captured images and determine whether the motion component of the detected motion is equal to or greater than a certain value;
extracting feature data of an object causing the detected motion;
determining a type of object and distinguishing between objects of a same type based on the extracted feature data;
comparing the extracted feature data of the object causing the detected motion and feature data of the at least one target object;
deciding whether the object causing the motion is identical or similar to the target object; and
determining whether or not to perform a recording operation for recording the captured images based on a result of the decision,
wherein when the deciding step decides the object causing the motion is identical or similar to the target object, the determining step does not perform the recording operation, and
wherein, when the deciding step decides the object causing the motion is not identical or similar to the target object, the determining step performs the recording operation;
assigning priority levels to sub-areas within the surveillance area;

assigning a priority level to the target object;
determining if the assigned priority level of the target object is less than an assigned priority level of a corresponding sub-area when the target object is viewed within the corresponding sub-area of the surveillance area; performing a predetermined camera function to capture images of the target object based on a result of the determining step;
wherein the performing step performs a camera zooming function and records the images captured for the target object in the corresponding sub-area when the determining step determines the assigned priority level of the target object is less than the assigned priority level of the corresponding sub-area and when a difference of the priority levels is more than one level, and performs a non-zooming camera function and records the images captured for the target object in the corresponding sub-area when the determining step determines the assigned priority level of the target object is less than the assigned priority level of the corresponding sub-area and when a difference of the priority levels is one level.

2. The video processing method of claim 1, wherein the feature data of the at least one target object and the object causing the detected motion comprises at least one of a shape, a size, a texture, a color, an edge, and a motion of the object.

3. The video processing method of claim 1, further comprising: storing the feature data of the target object before extracting the feature data of the object causing the detected motion.

4. The video processing method of claim 3, wherein the storing step stores the feature data of the target object in association with a corresponding target object ID.

5. The video processing method of claim 3, wherein the storing step stores the feature data of the target object in association with information indicating an area where motion of the target object will occur.

6. The video processing method of claim 3, wherein the storing step stores the feature data of the target object in association with valid channel information indicating that motion generated by the target object is to be disregarded.

7. The video processing method of claim 3, wherein the storing step stores the feature data of the target object in association with information indicating a level of a channel in which motion generated by the target object is to be disregarded.

8. The video processing method of claim 1, wherein the selecting step comprises a user selecting the target object by designating a portion within the surveillance area.

9. The video processing method of claim 1, wherein the comparing step compares a plurality of feature factors corresponding to the feature data between the target object and the object causing the motion.

10. The video processing method of claim 9, wherein the comparing step decides the object causing the motion is identical or similar to the target object when a predetermined number of the feature factors are identical or similar to each other, or a degree in which the feature factors are identical to each other is above a predetermined threshold.

11. The video processing method of claim 1, wherein the performing step does not record the images captured for the target object in the corresponding sub-area when the determining step determines the assigned priority level of the target object is not less than the assigned priority level of the corresponding sub-area.

12. The video processing method of claim 1, wherein the type of object is persons.

13. A surveillance video processing apparatus, comprising:
an input device allows a user to select at least one target object from a surveillance area;
a camera captures images of the surveillance area;
a motion detector detects motion has occurred in the surveillance area by calculating a motion component between a current frame and a neighboring frame of the captured images and determine whether the motion component of the detected motion is equal to or greater than a certain value;
a feature extractor extracts feature data of an object causing the detected motion; and
a controller:
determines a type of object and distinguishing between objects of a same type based on the extracted feature data;
compares the extracted feature data of the object causing the detected motion and feature data of the at least one target object;
decides whether the object causing the motion is identical or similar to the target object; and
determines whether or not to perform a recording operation for recording the captured images based on a result of the decision when the motion detector determines the detected motion component is equal to or greater than a certain value,
wherein when the controller decides the object causing the motion is identical or similar to the target object, the controller does not perform the recording operation,
wherein, when the controller decides the object causing the motion is not identical or similar to the target object, the controller performs the recording operation, and
wherein the input device, the camera, the motion detector and the feature extractor operate under a control of the controller;
wherein the controller assigns priority levels to sub-areas within the surveillance area, and to assign a priority level to the target object, and
wherein the controller determines if the assigned priority level of the target object is less than an assigned priority level of a corresponding sub-area when the target object is viewed within the corresponding sub-area of the surveillance area, and to perform a predetermined camera function to capture images of the target object based on a result of the determination;
wherein the controller performs a camera zooming function and record the images captured for the target object in the corresponding sub-area when the controller determines the assigned priority level of the target object is less than the assigned priority level of the corresponding sub-area and when a difference of the priority levels is more than one level, and to perform a non-zooming camera function and record the images captured for the target object in the corresponding sub-area when the controller determines the assigned priority level of the target object is less than the assigned priority level of the corresponding sub-area and when a difference of the priority levels is one level.

14. The video processing apparatus of claim 13, wherein the feature data of the at least one target object and the object causing the detected motion comprises at least one of a shape, a size, a texture, a color, an edge, and a motion of the object.

15. The video processing apparatus of claim 13, further comprising: a memory stores the feature data of the target object before extracting the feature data of the object causing the detected motion.

16. The video processing apparatus of claim 15, wherein the memory stores the feature data of the target object in association with a corresponding target object ID.

17. The video processing apparatus of claim 15, wherein the memory stores the feature data of the target object in association with information indicating an area where motion of the target object will occur.

18. The video processing apparatus of claim 15, wherein the memory stores the feature data of the target object in association with valid channel information indicating that motion generated by the target object is to be disregarded.

19. The video processing apparatus of claim 15, wherein the memory stores the feature data of the target object in association with information indicating a level of a channel in which motion generated by the target object is to be disregarded.

20. The video processing apparatus of claim 13, wherein the input device comprises a designation feature allowing a user to select the target object by designating a portion within the surveillance area.

21. The video processing apparatus of claim 13, wherein the controller compares a plurality of feature factors corresponding to the feature data between the target object and the object causing the motion.

22. The video processing apparatus of claim 21, wherein the controller decides whether the object causing the motion is identical or similar to the target object when a predetermined number of the feature factors are identical or similar to each other, or a degree in which the feature factors are identical to each other is above a predetermined threshold.

23. The video processing apparatus of claim 13, wherein the controller does not record the images captured for the target object in the corresponding sub-area when the controller determines the assigned priority level of the target object is not less than the assigned priority level of the corresponding sub-area.

24. The video processing apparatus of claim 13, wherein the type of object is persons.

* * * * *